United States Patent
Chang et al.

(10) Patent No.: US 11,058,171 B2
(45) Date of Patent: Jul. 13, 2021

(54) SHOE MATERIAL PART

(71) Applicant: CCILU INTERNATIONAL INC., Taichung (TW)

(72) Inventors: Shu-Li Chang, Taichung (TW); Chien-Chung Huang, Taichung (TW); Yeng-Fong Shih, Taichung (TW)

(73) Assignee: CCILU INTERNATIONAL INC., Taichung (TW)

(*) Notice: Subject to any disclaimer, the term of this patent is extended or adjusted under 35 U.S.C. 154(b) by 177 days.

(21) Appl. No.: 16/254,129

(22) Filed: Jan. 22, 2019

(65) Prior Publication Data
US 2019/0380433 A1    Dec. 19, 2019

(30) Foreign Application Priority Data
Jun. 13, 2018  (TW) .................................. 107207910

(51) Int. Cl.
| | |
|---|---|
| *A43B 13/04* | (2006.01) |
| *A43B 1/00* | (2006.01) |
| *A43B 13/12* | (2006.01) |
| *A43B 3/12* | (2006.01) |
| *A43B 17/00* | (2006.01) |

(52) U.S. Cl.
CPC ............ *A43B 13/12* (2013.01); *A43B 1/0045* (2013.01); *A43B 1/0063* (2013.01); *A43B 3/12* (2013.01); *A43B 13/04* (2013.01); *A43B 17/006* (2013.01)

(58) Field of Classification Search
CPC ....... A43B 1/0045; A43B 1/0063; A43B 3/12; A43B 3/04; A43B 17/003; A43B 17/006; A43B 17/10
See application file for complete search history.

(56) References Cited

U.S. PATENT DOCUMENTS

| | | | | |
|---|---|---|---|---|
| 4,185,402 | A * | 1/1980 | Digate ................. | A43B 1/0045 36/3 B |
| 8,440,138 | B1 * | 5/2013 | Standifer ............. | A43B 7/1405 422/5 |
| 2017/0359967 | A1 * | 12/2017 | Tetrault ................... | A41D 1/02 |
| 2019/0106551 | A1 * | 4/2019 | Fischer ................ | A43B 17/003 |
| 2020/0345104 | A1 * | 11/2020 | Mangold .............. | A43B 17/102 |

* cited by examiner

*Primary Examiner* — Ted Kavanaugh
(74) *Attorney, Agent, or Firm* — Wang Law Firm, Inc.

(57) ABSTRACT

The present invention provides a shoe material part mainly composed of a coffee ground material, a porous material and a rubber-plastic material, and is made of a recycled waste porous material and recycled waste coffee grounds, which can improve the value of waste recycling and reuse, and reduce environmental pollution, in addition to reducing waste, there will be no residue pollution of natural ecology and other issues in the subsequent environmental recycling, quite in line with environmental requirements. In addition, the present invention has the function of natural deodorization, because the coffee grounds can naturally diffuse the aroma of coffee, and the characteristics of better deodorization and air permeability of the coffee grounds can be used to reduce the foul smell of a user's foot.

6 Claims, 4 Drawing Sheets

SHOE MATERIAL PART

BACKGROUND

Field of Invention

The present invention relates to a shoe material part and more particularly to a shoe material part that is in line with environmental protection requirements.

Related Art

Generally, footwear is made of polyurethane or materials that do not meet environmental protection standards. Because of their limited ventilation effect, they fail to achieve the desired effect of eliminating hot air and moisture. After a user wears the footwear for a period of time, it is easy for the user's foot to accumulate sweat. The user's foot tends to feel uncomfortable or sweaty due to sultry heat, which makes the shoe full of stench, foul smell and mold to affect hygiene.

Furthermore, since the general footwear is made of polyurethane, it is not easily decomposed by burying in the soil. When incinerating, many pollutants harmful to the human body are generated or the environment is seriously polluted by the released toxins. The problems of difficulty in recycling and reuse, recycling and decomposition being difficult to handle, and increased amount of waste have caused serious damage to the global environment for many years. How to reduce the amount of waste and meet the environmental recyclability has always been the goal pursued by modern people.

On the other hand, modern people are influenced by western culture, and the demand for coffee is getting bigger and bigger. Whether it is to cook a cup of rich, aromatic and luscious coffee yourself or to buy one from a beverage shop that can be seen everywhere, coffee provides many people with a full day of vitality. However, after drinking coffee, it is inevitable to leave coffee grounds, the amount accumulated over time is quite astonishing. Although a portion of coffee grounds can be recycled, it still can't compare with the speed of production of coffee grounds.

Therefore, how to solve the above problems and drawbacks is the issue that the inventor of the present invention and related companies are eager to research and improve.

SUMMARY OF THE INVENTION

An object of the present invention is to provide a shoe material part made of recycled waste coffee grounds and a recycled waste porous material, which can improve the recyclability and reusability of waste, meet the environmental protection requirements, and has the effects of air permeability and fragrance, thereby achieving a purpose of eliminating the foul smell of the foot.

Thus, the present invention relates to a shoe material part, comprising:

a shoe material body being composed of a coffee ground material, a porous material, and a rubber-plastic material, the porous material being mixed with the coffee ground material to form porous structures distributed in the rubber-plastic material, and the rubber-plastic material encasing surrounding the porous structure structures.

Preferably, wherein the rubber-plastic material is natural rubber (NR), or ethylene vinyl acetate copolymer (EVA).

Preferably, wherein the porous material is diatomaceous earth.

Preferably, wherein a shoe comprises an insole, the shoe material body and an outsole, and the shoe material body is disposed between the insole and the outsole.

Preferably, wherein the shoe material body is a sole, a vamp, a shoe ornament, or a connecting strap.

Preferably, wherein the rubber-plastic material has a plurality of pores, and a pore diameter of the pores is larger than a body diameter of gaseous molecules of an aroma of the coffee ground material, so that the aroma of the coffee ground material penetrates the pores of the rubber-plastic material.

Thereby, the present invention provides a shoe material part mainly composed of a coffee ground material, a porous material and a rubber-plastic material, and is made of a recycled waste porous material and recycled waste coffee grounds, which can improve the value of waste recycling and reuse, and reduce environmental pollution, in addition to reducing waste, there will be no residue pollution of natural ecology and other issues in the subsequent environmental recycling, quite in line with environmental requirements.

In addition, the present invention has the function of natural deodorization, because the coffee grounds can naturally diffuse the aroma of coffee, and the characteristics of better deodorization and air permeability of the coffee grounds can be used to reduce the foul smell of a user's foot and greatly prolong the effect of releasing the fragrance in order to increase the user's comfort.

In order to make the above features and advantages of the present invention more apparent, the following specific embodiments are described in detail with reference to the accompanying drawings.

DETAILED DESCRIPTION OF THE INVENTION

The foregoing and other technical contents, features and effects of the present invention to achieve the above object will be clearly presented in the following detailed description of the preferred embodiments with reference to the drawings.

Figure 1:
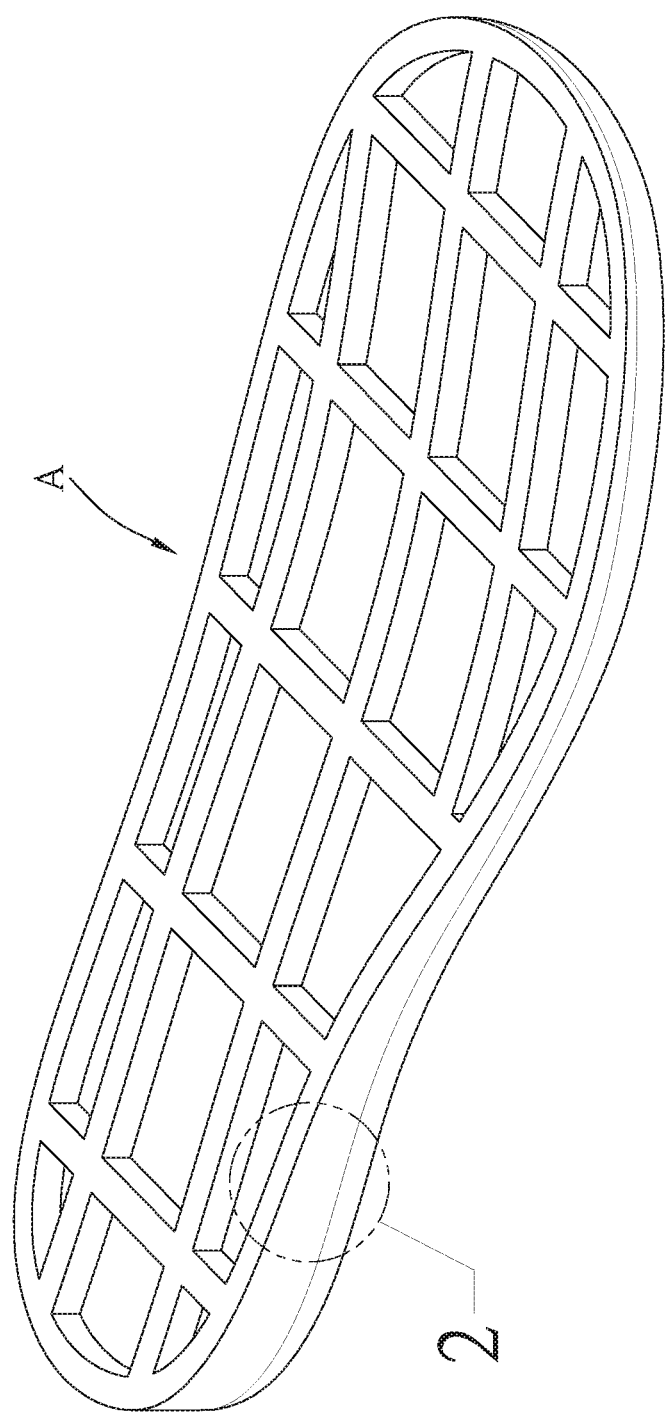
FIG. 1 is a perspective view of a first embodiment of the present invention showing a shoe material body as a sole.
Figure 2:
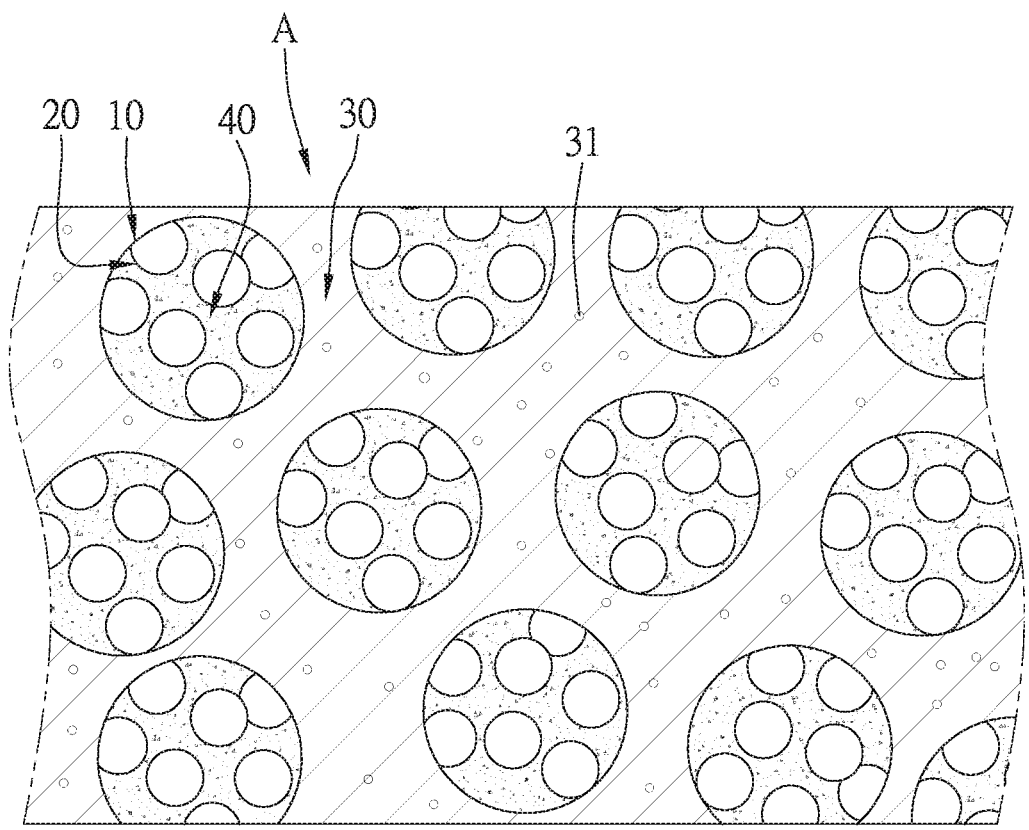
FIG. 2 is an enlarged cross-sectional view of the first embodiment of the present invention.

Referring to FIG. 1 to FIG. 2, a first embodiment of the present invention provides a shoe material part comprising a shoe material body, and the shoe material body A is mainly composed of a coffee ground material 10, a porous material 20 and a rubber-plastic material 30. In this embodiment, the shoe material body A is utilized in a sole as an example, but is not limited thereto, and can also be utilized in a vamp, a shoe ornament, or a connecting strap.

The coffee ground material 10 is ground coffee beans or coffee grounds, has a coffee aroma, and is in granular shape. Through the disposition of the coffee ground material 10, the shoe material body A has the effects of dehumidification, deodorization and bacteriostasis, also can eliminate the foul smell of a user's foot, produce coffee aroma, reduce the amount of waste, and meet the environmental protection requirements. Through the design of the coffee ground material 10, the present invention can greatly extend the effect of releasing the fragrance. The fragrance is slowly released to avoid the fragrance being lost too fast, so as to increase the user's comfort, making the invention environmentally friendly and practical.

The porous material 20 is mixed with the coffee ground material 10 to form porous structures 40. In the present embodiment, the porous material 20 is diatomaceous earth and is in the form of powder particles. A body diameter the porous material 20 is smaller than a body diameter of the coffee ground material 10, and is mixed with the coffee ground material 10 in a stirring manner. Since the porous material 20 is diatomaceous earth, it can be soilified and completely decomposed after being buried. Recycling does not create an environmental burden and is highly environmentally friendly.

The rubber-plastic material 30 encases (or surrounds) the porous structures 40. In this embodiment, the rubber-plastic material 30 is exemplified by using natural rubber (NR), but is not limited thereto. The rubber-plastic material 30 can also be ethylene vinyl acetate copolymer (EVA), which effectively strengthens the mechanical strength between the materials, and is non-toxic and conforms to the characteristics of environmentally-friendly green materials. Further, the rubber-plastic material 30 has a plurality of pores 31, and a pore diameter of the pores 31 is larger than a body diameter of gaseous molecules of an aroma of the coffee ground material 10, so that the aroma of the coffee ground material 10 penetrates the pores 31 of the rubber-plastic material 30 to achieve the fragrant effect.

Figure 3:
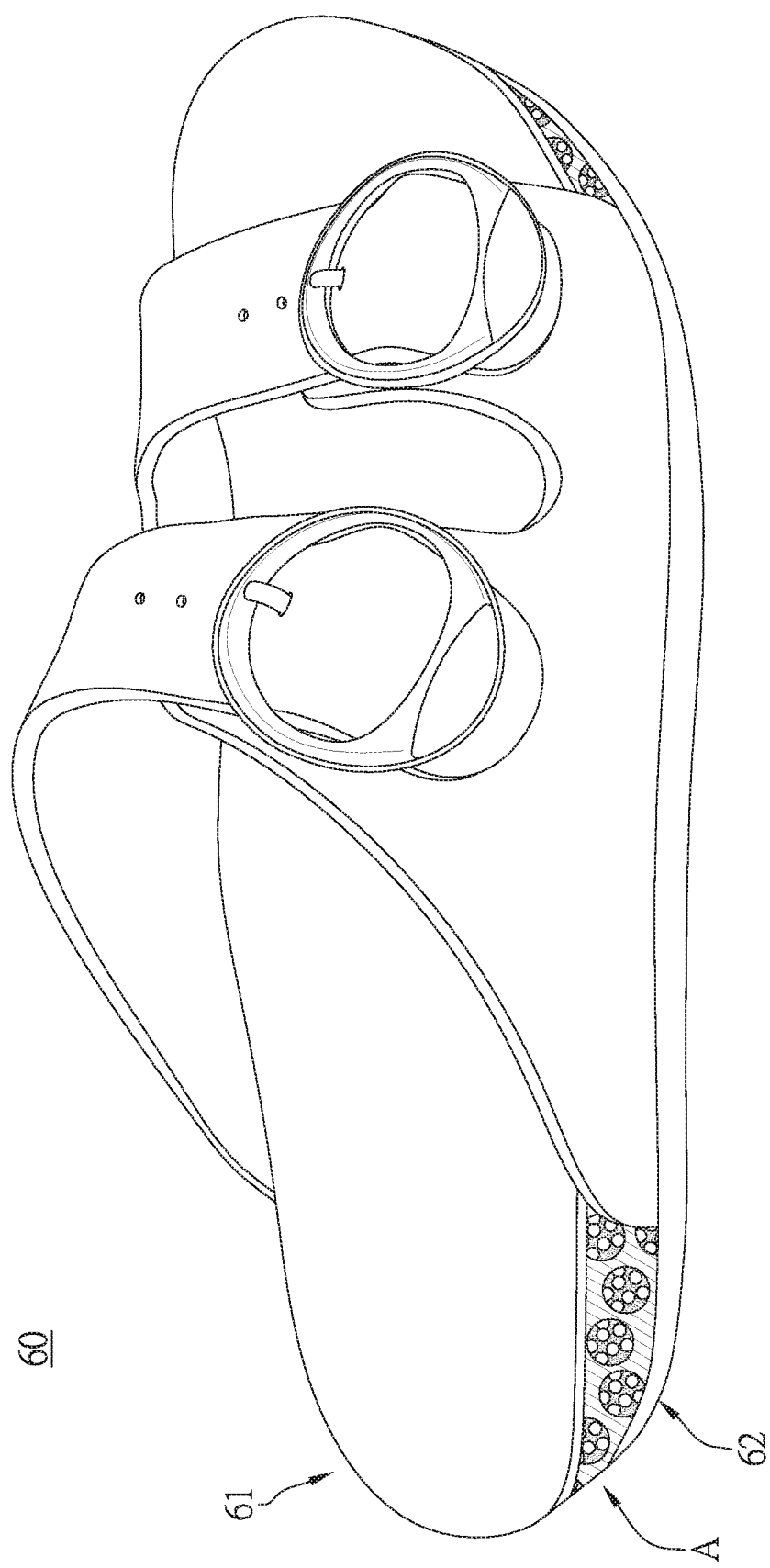
FIG. 3 is a perspective view of a second embodiment of the present invention showing the shoe material body being applicable for a shoe and disposed between an insole and an outsole.

Referring to FIG. 3, a second embodiment of the present invention provides a shoe material part as a sole of a shoe 60, the sole of the shoe 60 comprises an insole 61, a shoe material body A and an outsole 62, and the shoe material body A is disposed between the insole 61 and the outsole 62. Thereby, the invention is easy to be decomposed in the natural environment to reduce environmental damage, so as to meet the environmental protection requirements of today's society, and does not have harmful effects on the environment, so that people can have an environmentally friendly, sustainable and non-toxic living environment.

Figure 4:
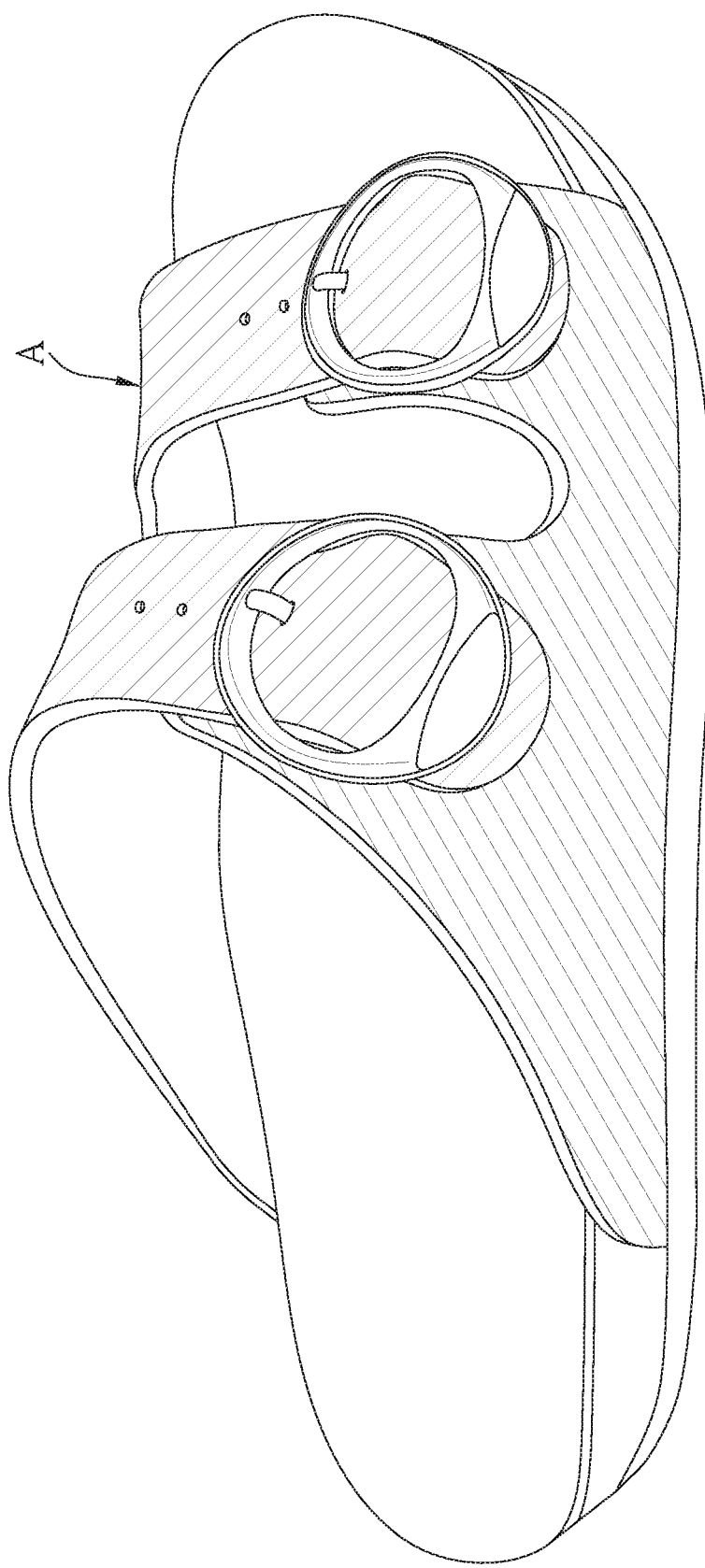
FIG. 4 is a perspective view of a third embodiment of the present invention showing the shoe material body as a connecting strap.

Referring to FIG. 4, a third embodiment of the present invention provides a shoe material part, which has the same structure and configuration as that of the first embodiment described above, except that the shoe material body A is a connecting strap; thereby, this embodiment improves the recyclability and reusability of waste, and meets the environmental protection requirements.

The above is the configuration description of each of the main components of the embodiments of the present invention. The following describes the use and effects of the invention.

Thereby, the present invention provides a shoe material part mainly composed of the coffee ground material 10, the porous material 20 and the rubber-plastic material 30, and is made of the recycled waste porous material 20 and the recycled waste coffee ground material 10, which can improve the value of waste recycling and reuse, and reduce environmental pollution, in addition to reducing waste, there will be no residue pollution of natural ecology and other issues in the subsequent environmental recycling, quite in line with environmental requirements.

In addition, the present invention has the function of natural deodorization, because the coffee ground material 10 can naturally diffuse the aroma of coffee, and the characteristics of better deodorization and air permeability of the coffee ground material 10 can be used to reduce the foul smell of the user's foot and greatly prolong the effect of releasing the fragrance in order to increase the user's comfort.

In summary, the above embodiments and drawings are merely the preferred embodiments of the present invention, and the scope of implementation of the present invention is not limited thereto. In other words, all the equivalent changes and modifications made according to the appended claims shall still fall within the scope covered by the appended claims of the present invention.

What is claimed is:

1. A shoe material part, comprising:
a shoe material body being composed of a coffee ground material, a porous material, and a rubber-plastic material, the porous material being mixed with the coffee ground material to form porous structures distributed in the rubber-plastic material, and the rubber-plastic material surrounding the porous structures.

2. The shoe material part as claimed in claim 1, wherein the rubber-plastic material is natural rubber (NR), or ethylene vinyl acetate copolymer (EVA).

3. The shoe material part as claimed in claim 1, wherein the porous material is diatomaceous earth.

4. The shoe material part as claimed in claim 1, wherein the sole material body is a sole configured to be disposed between an insole and an outsole.

5. The shoe material part as claimed in claim 1, wherein the shoe material body is a sole, a vamp, a shoe ornament, or a connecting strap.

6. The shoe material part as claimed in claim 1, wherein the rubber-plastic material has a plurality of pores, and a pore diameter of the pores is configured to larger than a body diameter of gaseous molecules of an aroma of the coffee ground material, so that the aroma of the coffee ground material penetrates the pores of the rubber-plastic material.

* * * * *